United States Patent
Ito et al.

(10) Patent No.: US 10,597,019 B2
(45) Date of Patent: Mar. 24, 2020

(54) VEHICLE CONTROL APPARATUS

(71) Applicant: TOYOTA JIDOSHA KABUSHIKI KAISHA, Toyota-shi, Aichi-ken (JP)

(72) Inventors: Hironori Ito, Susono (JP); Akira Nagae, Susono (JP); Ryo Inomata, Ashigarakami-gun (JP); Masayuki Ikeda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 135 days.

(21) Appl. No.: 15/647,994

(22) Filed: Jul. 12, 2017

(65) Prior Publication Data
US 2018/0072298 A1 Mar. 15, 2018

(30) Foreign Application Priority Data
Sep. 12, 2016 (JP) .................. 2016-177626

(51) Int. Cl.
*B60W 10/00* (2006.01)
*B60W 10/184* (2012.01)
*B60T 8/1755* (2006.01)
*B60W 30/02* (2012.01)

(52) U.S. Cl.
CPC ....... *B60W 10/184* (2013.01); *B60T 8/17555* (2013.01); *B60T 8/17557* (2013.01); *B60W 30/025* (2013.01); *B60T 2201/083* (2013.01); *B60W 2520/06* (2013.01); *B60W 2520/14* (2013.01); *B60W 2710/182* (2013.01)

(58) Field of Classification Search
CPC ................................................. B60T 8/17557
See application file for complete search history.

(56) References Cited

U.S. PATENT DOCUMENTS

| | | | |
|---|---|---|---|
| 6,246,947 B1 * | 6/2001 | Batistic | B60T 8/1755 303/186 |
| 6,276,766 B1 * | 8/2001 | Yamada | B60T 8/1755 303/113.2 |
| 6,374,162 B1 * | 4/2002 | Tanaka | B60T 8/1755 180/197 |
| 6,438,474 B1 * | 8/2002 | Tanaka | B60T 8/1755 303/140 |
| 2003/0120414 A1 * | 6/2003 | Matsumoto | B60K 31/0008 701/96 |

(Continued)

FOREIGN PATENT DOCUMENTS

EP 1588911 A2 10/2005
JP 2006-282168 A 10/2006

*Primary Examiner* — Truc M Do
(74) *Attorney, Agent, or Firm* — Sughrue Mion, PLLC (57) ABSTRACT

A vehicle control apparatus is provided with: a controller (i) configured to set first brake fluid pressure associated with wheels on one of left and right sides out of a plurality of wheels to be higher than second brake fluid pressure associated with wheels on the other side in order to turn a vehicle in one direction, and configured (ii) to then increase the second brake fluid pressure by using a fluid pressure difference between the first brake fluid pressure and the second brake fluid pressure, and (iii) to set the first brake fluid pressure to be lower than the second brake fluid pressure while holding the second brake fluid pressure in order to turn the vehicle in another direction, which is different from the one direction.

4 Claims, 7 Drawing Sheets

(56) References Cited

U.S. PATENT DOCUMENTS

| | | | |
|---|---|---|---|
| 2004/0158377 A1* | 8/2004 | Matsumoto | B60T 8/17557 701/48 |
| 2004/0186650 A1* | 9/2004 | Tange | B60T 8/17557 701/96 |
| 2005/0096827 A1* | 5/2005 | Sadano | B60T 7/22 701/70 |
| 2005/0107939 A1* | 5/2005 | Sadano | B60T 8/17557 701/70 |
| 2005/0125153 A1* | 6/2005 | Matsumoto | B60T 8/17557 701/300 |
| 2005/0177308 A1* | 8/2005 | Tange | B60T 8/17557 701/301 |
| 2005/0236895 A1* | 10/2005 | Matsumoto | B60T 8/17557 303/140 |
| 2006/0142921 A1* | 6/2006 | Takeda | B60T 8/17557 701/70 |
| 2006/0142922 A1* | 6/2006 | Ozaki | B60T 8/17557 701/70 |
| 2006/0149448 A1* | 7/2006 | Tange | B60T 8/17557 701/41 |
| 2006/0217887 A1* | 9/2006 | Iwasaka | B60T 8/1708 701/301 |
| 2007/0255474 A1* | 11/2007 | Hayakawa | B60T 8/17551 701/70 |
| 2008/0021613 A1* | 1/2008 | Hamaguchi | B60T 8/17557 701/41 |
| 2008/0172153 A1* | 7/2008 | Ozaki | B60T 8/17557 701/36 |
| 2011/0130923 A1 | 6/2011 | Watanabe | |
| 2012/0136547 A1* | 5/2012 | Miyazaki | B60T 1/10 701/70 |
| 2012/0139330 A1* | 6/2012 | Morishita | B60T 1/10 303/3 |
| 2012/0158266 A1* | 6/2012 | Miyazaki | B60L 50/61 701/70 |
| 2013/0253793 A1 | 9/2013 | Lee et al. | |

* cited by examiner

VEHICLE CONTROL APPARATUS

CROSS-REFERENCE TO RELATED APPLICATIONS

This application is based upon and claims the benefit of priority of the prior Japanese Patent Application No. 2016-177626, filed on Sep. 12, 2016, the entire contents of which are incorporated herein by reference.

BACKGROUND OF THE INVENTION

1. Field of the Invention

Embodiments of the present invention relate to a vehicle control apparatus.

2. Description of the Related Art

For this type of apparatus, for example, there has been proposed an apparatus configured to generate a yaw moment in a direction of avoiding lane departure by using a braking force difference between left and right wheels if a subject vehicle is about to depart or deviate from a driving lane (refer to Japanese Patent Application Laid Open No. 2006-282168).

In the aforementioned Related Art, the vehicle makes a rotational movement (i.e. yawing) in the direction of avoiding the lane departure. This results in a difference between a traveling direction of the vehicle and an extending direction of the driving lane. It is thus desirable that posture of the vehicle is automatically corrected in order to match the traveling direction of the vehicle with the extending direction of the driving lane after avoiding the lane departure (i.e. in order to suppress second lane departure). Here, if the yaw moment based on the braking force difference between the left and right wheels is applied to the vehicle to turn the vehicle in an opposite direction to the direction of avoiding the lane departure, a driver possibly feels discomfort depending on how to apply braking force to the wheels, which is technically problematic.

The same technical problem can occur not only in the apparatus configured to avoid the lane departure by applying the yaw moment based on the braking force difference between the left and right wheels, but also in all apparatuses configured to apply the yaw moment based on the braking force difference between the left and right wheels.

SUMMARY

In view of the aforementioned problem, it is therefore an object of embodiments of the present invention to provide a vehicle control apparatus configured to suppress the driver's discomfort when the vehicle is turned in one direction by using the braking force difference between the left and right wheels and immediately afterwards the vehicle is turned in another direction.

The above object of embodiments of the present invention can be achieved by a vehicle control apparatus in a vehicle including a braking apparatus configured to apply braking force corresponding to brake fluid pressure, to each of a plurality of wheels, said vehicle control apparatus is provided with: a controller (i) configured to set first brake fluid pressure associated with wheels on one of left and right sides out of the plurality of wheels to be higher than second brake fluid pressure associated with wheels on the other side in order to turn the vehicle in one direction, and configured (ii) to then increase the second brake fluid pressure by using a fluid pressure difference between the first brake fluid pressure and the second brake fluid pressure, and (iii) to set the first brake fluid pressure to be lower than the second brake fluid pressure while holding the second brake fluid pressure in order to turn the vehicle in another direction, which is different from the one direction.

Deceleration (or braking force) in a longitudinal direction of the vehicle increases, decreases, increases, and decreases if braking force applied to the wheels on one of left and right sides is set to be higher than braking force applied to the wheels on the other side in order to turn the vehicle in one direction and the application of the braking force is then temporarily stopped, and if the braking force applied to the wheels on the other side is set to be higher again than the braking force applied to the one side in order to turn the vehicle in another direction and the application of the braking force is then stopped. Then, a driver possibly feels so-called momentary brake loss and discomfort.

According to the vehicle control apparatus, the first brake fluid pressure associated with the wheels on the one of left and right sides is set to be higher than the second brake fluid pressure associated with the wheels on the other side, and then, the second brake fluid pressure is increased by using the fluid pressure difference between the first brake fluid pressure and the second brake fluid pressure. In other words, reduction in the first brake fluid pressure and increase in the second brake fluid pressure are performed in parallel. The deceleration in the longitudinal direction of the vehicle hardly changes in a period in which the second brake fluid pressure is increased by using the fluid pressure difference. After the second brake fluid pressure is increased, the first brake fluid pressure is reduced while the second brake fluid pressure is hold. The deceleration in the longitudinal direction of the vehicle thus monotonously decreases. It is therefore possible to suppress the driver's discomfort or the like caused by the deceleration change.

In the vehicle control apparatus, as described above, the reduction in the first brake fluid pressure and the increase in the second brake fluid pressure are performed in parallel. Here, the brake fluid pressure is reduced via a pressure reducing solenoid valve, which is typically a duty control type solenoid valve. The duty control type solenoid valve has relatively loud operating noise. In the present invention, however, the second brake fluid pressure is increased by the fluid pressure difference between the first brake fluid pressure and the second brake fluid pressure. In other words, in the present invention, a braking mechanism (e.g. a wheel cylinder) for the wheels on one of the left and right sides is communicated with a braking mechanism for the wheels on the other side, without via the pressure reducing solenoid valve. As a result, the second brake fluid pressure increases while the first brake fluid pressure decreases. In the vehicle control apparatus, the first brake fluid pressure is not reduced via the pressure reducing solenoid valve, and it is thus possible to avoid generation of the operating noise of the pressure reducing solenoid valve.

As a result, according to the vehicle control apparatus, it is possible to suppress the driver's discomfort when the vehicle is turned in one direction by using the braking force difference between the left and right wheels and immediately afterwards the vehicle is turned in another direction.

Examples in which the vehicle is turned in one direction by using the braking force difference between the left and right wheels and immediately afterwards the vehicle is turned in another direction, are as follows; (i) the vehicle is returned to a target position in the driving lane (e.g. a lane center) after avoiding departure of the vehicle from a driving lane; (ii) the vehicle is returned to the target position if a position of the vehicle in a lane width direction is shifted from the target position due to lateral wind (so-called lateral wind control); and (iii) emergency avoidance of a preceding vehicle or an obstacle.

In one aspect of the vehicle control apparatus according to embodiments of the present invention, <claim 2>

In the vehicle control apparatus, the second brake fluid pressure is increased by using the fluid pressure difference between the first brake fluid pressure and the second brake fluid pressure in the predetermined period from the pressure reduction start time point at which the first brake fluid pressure is relatively high. In other words, the first brake fluid pressure is not reduced via a pressure reducing solenoid valve configured to reduce the first brake fluid pressure, in the predetermined period from the pressure reduction start time.

Here, the pressure reducing solenoid valve has louder operating noise as the brake fluid pressure increases; namely, the pressure reducing solenoid valve has less operating noise as the brake fluid pressure decreases. According to this aspect, the first brake fluid pressure is not reduced via the pressure reducing solenoid valve (i.e. the pressure reducing solenoid valve does not operate), in the predetermined period from the pressure reduction start time at which the first brake fluid pressure is relatively high. It is thus possible to suppress the generation of the operating noise of the pressure reducing solenoid valve.

After the second brake fluid pressure is increased, if the first brake fluid pressure is set to be lower than the second brake fluid pressure, then, the first brake fluid pressure may be reduced via the pressure reducing solenoid valve configured to reduce the first brake fluid pressure. In this case, the first brake fluid pressure is relatively low, and thus, the pressure reducing solenoid valve has less operating noise than when the first brake fluid pressure is reduced via the pressure reducing solenoid valve immediately after the start of the reduction in the first brake fluid pressure, and the driver less likely feels discomfort due to the operating noise.

The "predetermined period" is a period in which the second brake fluid pressure is increased by using the fluid pressure difference between the first brake fluid pressure and the second brake fluid pressure. The second brake fluid pressure is increased more quickly as the period becomes shorter. As the period becomes shorter, however, for example, a yaw moment of the vehicle, the deceleration in the longitudinal direction or the like suddenly changes, and the driver thus possibly feels discomfort. It is therefore desirable that the "predetermined period" is set as a period in which a balance can be made between speed for increasing the second brake fluid pressure and change rate of the yaw moment and the deceleration or the like that does not give discomfort to the driver. In this setting, the driver's discomfort can be more suppressed. The "predetermined fluid pressure" means fluid pressure that allows generation of braking force to be applied to the wheels on one of the left and right sides in order to turn the vehicle in one direction.

In another aspect of the vehicle control apparatus according to embodiments of the present invention, the braking apparatus includes: a pump configured to generate brake fluid pressure, a first braking mechanism configured to apply braking force corresponding to the first brake fluid pressure to the wheels on the one of the left and right sides; a second braking mechanism configured to apply braking force corresponding to the second brake fluid pressure to the wheels on the other side; a first holding solenoid valve configured to communicate a discharge port of the pump with the first braking mechanism when it is open; a second holding solenoid valve configured to communicate the discharge port with the second braking mechanism when it is open; a first fluid passage, which connects the discharge port side of the first holding solenoid valve and the discharge port side of the second holding solenoid valve; and a master cylinder cut solenoid valve disposed in a second fluid passage, which connects a suction port of the pump and the first fluid passage, and said controller is configured (i) to open the first holding solenoid valve and to close the second holding solenoid valve and the master cylinder cut solenoid valve in a period in which the first brake fluid pressure is set to be higher than the second brake fluid pressure, (ii) to open the first holding solenoid valve and the second holding solenoid valve, thereby communicating the first braking mechanism with the second braking mechanism through the first fluid passage, and to close the master cylinder cut solenoid valve in a period in which the second brake fluid pressure is increased by using the fluid pressure difference, and (iii) to close the second holding solenoid valve and to open the first holding solenoid valve and the master cylinder cut solenoid valve, thereby communicating the first braking mechanism with the suction port, in a period in which the first brake fluid pressure is set to be lower than the second brake fluid pressure.

According to this aspect, the first brake fluid pressure is reduced without via the pressure reducing solenoid valve configured to reduce the first brake fluid pressure. It is thus possible to avoid the generation of the operating noise of the pressure reducing solenoid valve.

In another aspect of the vehicle control apparatus according to embodiments of the present invention, said controller is configured to set the first brake fluid pressure to be higher than the second brake fluid pressure in such a manner that a yaw moment is generated in the one direction, in order to avoid departure of the vehicle, if there is a possibility that the vehicle departs from a driving lane on which the vehicle is currently traveling.

According to this aspect, it is possible to suppress the departure of the vehicle from the driving lane while suppressing the driver's discomfort.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A vehicle control apparatus according to an embodiment of the present invention will be explained with reference to FIG. 1 to FIG. 7. In the following embodiment, a vehicle 1 equipped with the vehicle control apparatus according to embodiments of the present invention is used for explanation.

Configuration of Vehicle

Figure 1:
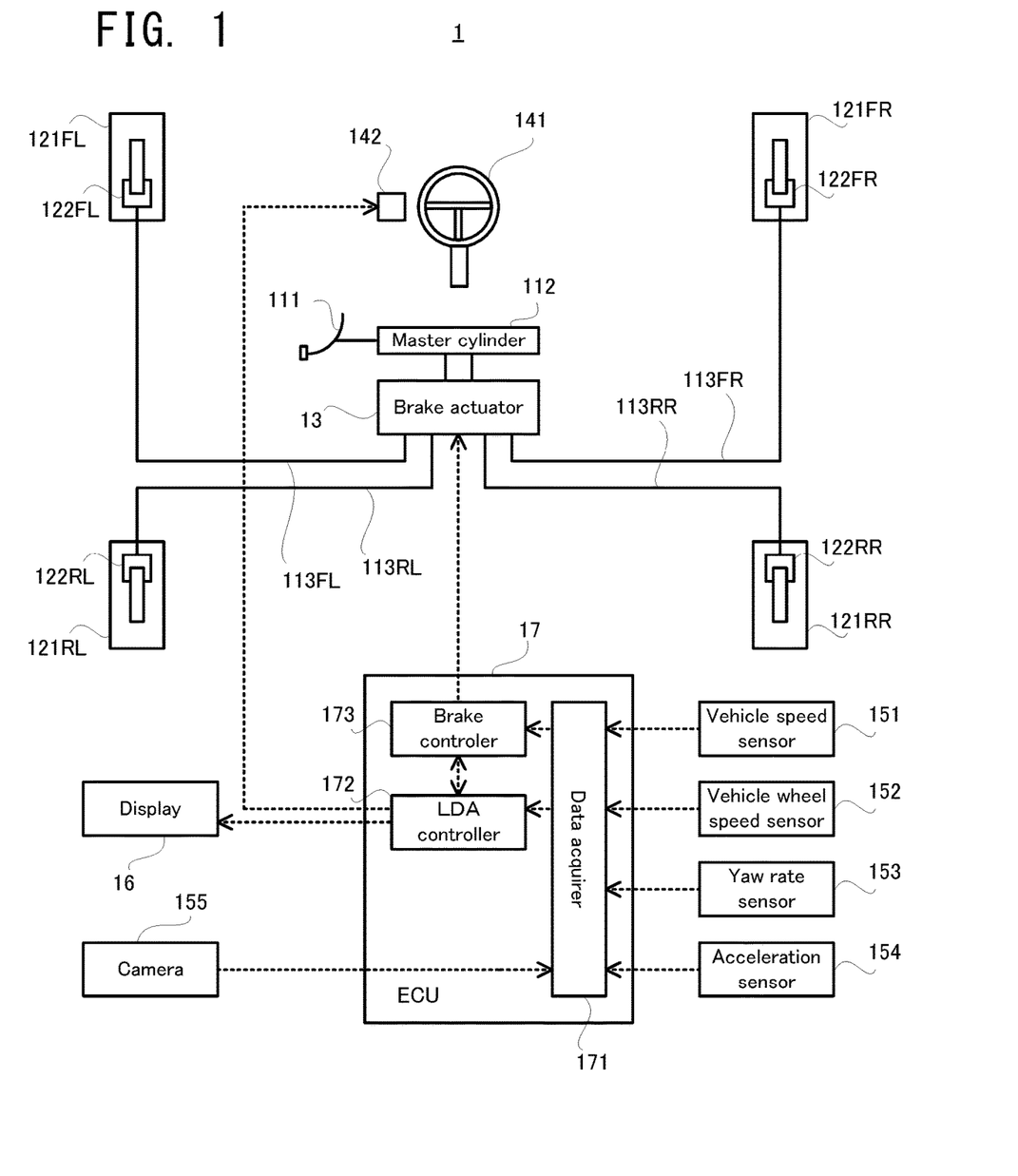
FIG. 1 is a block diagram illustrating a configuration of a vehicle according to an embodiment.

A configuration of the vehicle 1 will be explained with reference to FIG. 1. FIG. 1 is a block diagram illustrating the configuration of the vehicle 1 according to the embodiment.

In FIG. 1, the vehicle 1 is provided with a brake pedal 111, a master cylinder 112, a brake actuator 13, a wheel cylinder 122FL provided on a front left wheel 121FL, a wheel cylinder 122RL provided on a rear left wheel 121RL, a wheel cylinder 122FR provided on a front right wheel 121FR, a wheel cylinder 122RR provided on a rear right wheel 121RR, and brake pipes 113FL, 113R1, 113FR, and 113RR.

The vehicle 1 is further provided with a steering wheel 141, a vibration actuator 142, a vehicle speed sensor 151, a vehicle wheel speed sensor 152, a yaw rate sensor 153, an acceleration sensor 154, a camera 155, a display 16, and an electronic control unit (ECU) 17, which is one specific example of the "vehicle control apparatus" according to embodiments of the present invention.

The master cylinder 112 is configured to adjust pressure of brake fluid (or any fluid) in the master cylinder 112 in accordance with a step amount of the brake pedal 111. The pressure of the brake fluid in the master cylinder 112 (hereinafter referred to as "hydraulic pressure" as occasion demands) is transmitted to the wheel cylinders 122FL, 122RL, 122FR, and 122RR via the brake pipes 113FL, 113RL, 113FR, and 113RR, respectively. As a result, braking force corresponding to the pressure of the brake fluid transmitted to the wheel cylinders 122FL, 122RL, 122FR, and 122RR is applied to the front left wheel 121FL, the rear left wheel 121RL, the front right wheel 121FR, and the rear right wheel 121RR, respectively.

The brake actuator 13 is configured to adjust the hydraulic pressure transmitted to each of the wheel cylinders 122FL, 122RL, 122FR, and 122RR, independently of the step amount of the brake pedal 111, under control of the ECU 17. Therefore, the brake actuator 13 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by a driver to steer the vehicle 1 (i.e. to steer steering wheels). The vibration actuator 142 is configured to vibrate the steering wheel 141, under the control of the ECU 17.

The ECU 17 is configured to control entire operation of the vehicle 1. Particularly in the embodiment, the ECU 17 is configured to perform a lane departure suppressing operation for suppressing departure or deviation of the vehicle 1 from a driving lane on which the vehicle 1 is currently traveling. In other words, the ECU 17 functions as a control apparatus for realizing so-called LDA (Lane Departure Alert) or LDP (Lane Departure Prevention).

In order to perform the lane departure suppressing operation, the ECU 17 is provided with a data acquirer 171, a LDA controller 172, and a brake controller 173, as processing blocks logically realized, or processing circuits physically realized inside the ECU 17.

Figure 2:
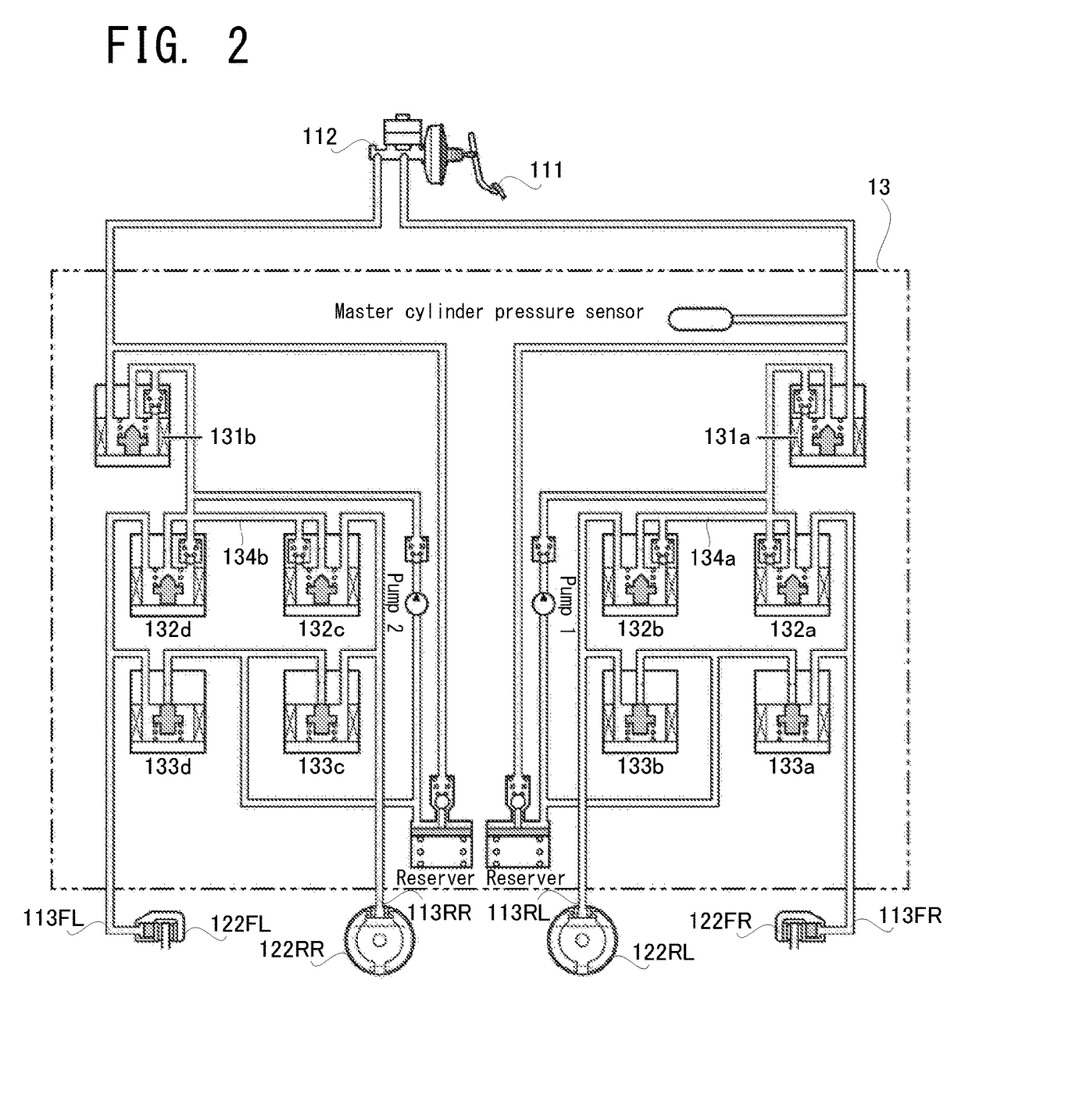
FIG. 2 is a schematic diagram illustrating a structure of a brake actuator according to the embodiment.

Now, the brake actuator 13 will be explained with reference to FIG. 2. FIG. 2 is a schematic diagram illustrating a structure of the brake actuator 13 according to the embodiment.

As illustrated in FIG. 2, two hydraulic routes from the master cylinder 112 are divided into four routes in the brake actuator 13. One of the two hydraulic routes has a master cylinder cut solenoid valve (hereinafter written as a "master cylinder cut SV" as occasion demands) 131a, holding solenoid valves (hereinafter written as "holding SVs" as occasion demands) 132a and 132b, and pressure reducing solenoid valves (hereinafter written as "pressure reducing SVs" as occasion demands) 133a and 133b. The other hydraulic route of the two hydraulic routes has a master cylinder cut SV 131b, holding SVs 132c and 132d, and pressure reducing SVs 133c and 133d.

When the holding SV 132a is open, a discharge port of a pump 1 (i.e. a high pressure side) is communicated with the wheel cylinder 122FR. When the holding SV 132b is open, the discharge port of the pump 1 is communicated with the wheel cylinder 122RL. When both the holding SVs 132a and 132b are open, the wheel cylinders 122FR and 122RL are communicated with each other via a pipe 134a.

When the pressure reducing SV 133a is open, the wheel cylinder 122FR is communicated with a suction port of the pump 1 (i.e. a low pressure side). When the pressure reducing SV 133b is open, the wheel cylinder 122RL is communicated with the suction port of the pump 1.

When the master cylinder cut SV 131a is open, the discharge port of the pump 1 is communicated with the suction port of the pump 1. In addition, when the holding SV 132a and the master cylinder cut SV 131a are open, the wheel cylinder 122FR is communicated with the suction port of the pump 1. In the same manner, when the holding SV 132b and the master cylinder cut SV 131a are open, the wheel cylinder 122RL is communicated with the suction port of the pump 1.

When the hydraulic pressure of the wheel cylinder 122FR is increased, the holding SV 132a is opened, and the pressure reducing SV 133a is closed. On the other hand, when the hydraulic pressure of the wheel cylinder 122FR is reduced, typically, the holding SV 132a is closed, and the pressure reducing SV 133a is opened. In the same manner, when the hydraulic pressure of the wheel cylinder 122RL is increased, the holding SV 132b is opened, and the pressure reducing SV 133b is closed. On the other hand, when the hydraulic pressure of the wheel cylinder 122RL is reduced, typically, the holding SV 132b is closed, and the pressure reducing SV 133b is opened.

When the holding SV 132C is open, a discharge port of a pump 2 is communicated with the wheel cylinder 122RR. When the holding SV 132d is open, the discharge port of the pump 2 is communicated with the wheel cylinder 122FL. Moreover, when both the holding SVs 132c and 132d are open, the wheel cylinders 122RR and 122FL are communicated with each other via a pipe 134b.

When the holding SV 133C is open, the wheel cylinder 122RR is communicated with a suction port of the pump 2.

When the pressure reducing SV 133*d* is open, the wheel cylinder 122FL is communicated with the suction port of the pump 2.

When the master cylinder cut SV 131*b* is open, the discharge port of the pump 2 is communicated with the suction port of the pump 2. In addition, when the holding SV 132*c* and the master cylinder cut SV 131*b* are open, the wheel cylinder 122RR is communicated with the suction port of the pump 2. In the same manner, when the holding SV 132*d* and the master cylinder cut SV 131*b* are open, the wheel cylinder 122FL is communicated with the suction port of the pump 2.

When the hydraulic pressure of the wheel cylinder 122RR is increased, the holding SV 132*c* is opened, and the pressure reducing SV 133*c* is closed. On the other hand, when the hydraulic pressure of the wheel cylinder 122RR is reduced, typically, the holding SV 132*c* is closed, and the pressure reducing SV 133*c* is opened. In the same manner, when the hydraulic pressure of the wheel cylinder 122FL is increased, the holding SV 132*d* is opened, and the pressure reducing SV 133*d* is closed. On the other hand, when the hydraulic pressure of the wheel cylinder 122FL is reduced, typically, the holding SV 132*d* is closed, and the pressure reducing SV 133*d* is opened.

The master cylinder cut SVs 131*a* and 131*b* and the holding SVs 132*a* to 132*d* are linear solenoid valves. On the other hand, the pressure reducing SVs 133*a* to 133*d* are duty control type solenoid valves.

FIG. 2 illustrates a so-called X-split system type structure having; a hydraulic system including the wheel cylinder 122FR of the front right wheel 121FR and the wheel cylinder 122RL of the rear left wheel 121RL; and a hydraulic system including the wheel cylinder 122FL of the front left wheel 121FL and the wheel cylinder 122RR of the rear right wheel 121RR. The present invention can be applied not only to the so-called X-split system type structure, but also to a so-called front-to-rear system type structure having; a hydraulic system including the wheel cylinder 122FL of the front left wheel 121FL and the wheel cylinder 122FR of the front right wheel 121FR; and a hydraulic system including the wheel cylinder 122RL of the rear left wheel 121RL and the wheel cylinder 122RR of the rear right wheel 121RR.

Lane Departure Suppressing Operation

Next, the lane departure suppressing operation according to the embodiment will be explained with reference to flowcharts in FIG. 3 and FIG. 4.

Outline of Lane Departure Suppressing Operation

The LDA controller 172 of the ECU 17 is configured to determine whether or not there is a possibility that the vehicle 1 departs from the driving lane on which the vehicle 1 is currently traveling, on the basis of detection data obtained by the data acquirer 171 (i.e. data indicating respective detection results of the vehicle speed sensor 151, the vehicle wheel speed sensor 152, the yaw rate sensor 153, and the acceleration sensor 154) and image data from the camera 155.

If there is the possibility of the lane departure, the LDA controller 172 is configured to apply braking force to each of the front left wheel 121FL, the rear left wheel 121RL, the front right wheel 121FR, and the rear right wheel 121RR, in order to apply to the vehicle 1 a suppression yaw moment by which the lane departure of the vehicle can be suppressed. In other words, in the embodiment, the departure of the vehicle 1 from the driving lane is suppressed by using a braking force difference. Hereinafter, the "lane departure suppression" according to the embodiment will be referred to as "brake LDA" as occasion demands.

The LDA controller 172 is configured to apply to the vehicle 1 a yaw moment in an opposite direction to a direction of the suppression yaw moment, in order to correct posture of the vehicle 1 (i.e. in order to match a traveling direction of the vehicle 1 with an extending direction of the driving lane) after applying the suppression yaw moment to the vehicle 1.

Here, the expression "to suppress the departure of the vehicle 1" means to reduce a departure distance from the driving lane when the suppression yaw moment is applied to the vehicle 1, in comparison with a departure distance from the driving lane when the suppression yaw moment is not applied to the vehicle 1.

Details of Lane Departure Suppressing Operation

Figure 3:
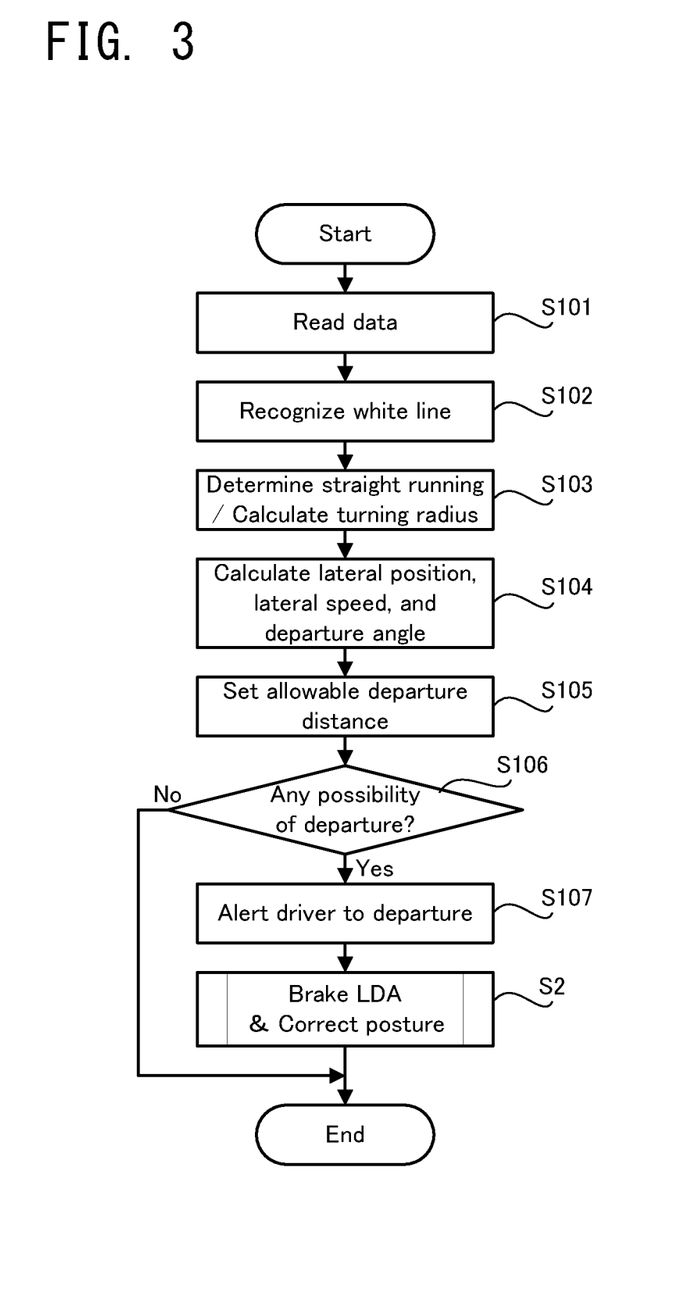
FIG. 3 is a flowchart illustrating a lane departure suppressing operation according to the embodiment.

In FIG. 3, firstly, the data acquirer 171 obtains the detection data indicating respective detection results of the vehicle speed sensor 151, the vehicle wheel speed sensor 152, the yaw rate sensor 153, and the acceleration sensor 154), and the image data indicating images taken by the camera 155 (step S101).

The LDA controller 172 analyzes the image data obtained in the process of the step S101, thereby specifying a lane edge of the driving lane on which the vehicle 1 is currently traveling (or a "white line" exemplified in the embodiment as one example of the lane edge) in the images taken by the camera 155 (step S102).

The LDA controller 172 determines whether or not the driving lane on which the vehicle 1 is currently traveling is a straight lane or a curve, on the basis of the white line specified in the process of the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the process of the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the process of the step S102 (step S104). Here, the "lateral position" means a distance from the center of the driving lane to the vehicle 1 (or typically a distance to the center of the vehicle 1) in a lane width direction orthogonal to a direction in which the driving lane extends (or a lane extension direction). The "lateral velocity" means a speed of the vehicle 1 in the lane width direction. The "departure angle" means an angle between the driving lane and a longitudinal direction axis of the vehicle 1 (i.e. an angle between the white line and the longitudinal direction axis of the vehicle 1).

The LDA controller 172 further sets an allowable departure distance (step S105). The allowable departure distance indicates an allowable maximum value of the departure distance of the vehicle 1 from the driving lane (i.e. the departure distance of the vehicle 1 from the white line) when the vehicle 1 departs from the driving lane. Thus, the lane departure suppressing operation is an operation of applying the suppression yaw moment to the vehicle 1 in such a manner that the departure distance of the vehicle 1 from the driving lane is within the allowable departure distance.

For example, the allowable departure distance may be set in the following manner; namely, the LDA controller 172 may set the allowable departure distance from the viewpoint of satisfying requirements of law and regulations (e.g. requirements of new car assessment programme (NCAP)). The allowable departure distance set from this viewpoint may be used as the allowable departure distance by default. The method of setting the allowable departure distance is not limited to this example.

Then, the LDA controller 172 determines whether or not there is a possibility that the vehicle 1 departs from the driving lane on which the vehicle 1 is currently traveling (step S106). Specifically, for example, the LDA controller 172 calculates a future position (e.g. in several to several ten seconds) of the vehicle 1, on the basis of the current speed, the current lateral position, the current lateral velocity, or the like of the vehicle 1. Then, the LDA controller 172 determines whether or not the vehicle 1 goes across or is on the white line in the future position. If it is determined that the vehicle 1 goes across or is on the white line in the future position, the LDA controller 172 determines that there is the possibility that the vehicle 1 departs from the driving lane.

In the determination in the step S106, if it is determined that there is no possibility that the vehicle 1 departs from the driving lane (the step S106: No), the lane departure suppressing operation illustrated in FIG. 3 is ended. Then, the LDA controller 172 restarts the lane departure suppressing operation illustrated in FIG. 3 after a lapse of a first predetermined period (e.g. several milliseconds to several ten milliseconds). In other words, the lane departure suppressing operation illustrated in FIG. 3 is repeated with a period corresponding to the first predetermined period.

On the other hand, in the determination in the step S106, if it is determined that there is the possibility that the vehicle 1 departs from the driving lane (the step S106: Yes), the LDA controller 172 turns on a control flag associated with the brake LDA, and alerts the driver of the vehicle 1 to the possibility of the departure of the vehicle 1 from the driving lane (step S107). Specifically, the LDA controller 172 controls the display 16, for example, to display images indicating the possibility of the departure of the vehicle 1 from the driving lane, and/or controls the vibration actuator 142 to inform the driver of the possibility of the departure of the vehicle 1 from the driving lane by using the vibration of the steering wheel 141.

If it is determined that there is the possibility that the vehicle 1 departs from the driving lane, the LDA controller 172 further performs a process associated with the brake LDA and the posture correction (step S2). This process will be explained in detail with reference to a flowchart in FIG. 4.

The LDA controller 172 firstly calculates a new traveling path on which the vehicle 1, which is traveling away from the center of the driving lane, will travel toward the center of the driving lane. At this time, the calculated traveling path satisfies restrictions imposed by the allowable departure distance set in the step S105.

Then, the LDA controller 172 calculates a yaw rate to be generated on the vehicle 1 in order to avoid the departure of the vehicle 1 from the driving lane, as a first target yaw rate (step S201). Then, the LDA controller 172 calculates a yaw moment to be applied the vehicle 1 in order to generate the first target yaw rate on the vehicle 1, as a first target yaw moment (step S202).

Here, the LDA controller 172 may calculate the first target yaw moment by converting or transferring the first target yaw rate to the first target yaw moment on the basis of a predetermined conversion function (and the same shall apply to a second target yaw moment described later). The first target yaw moment is equivalent to the aforementioned suppression yaw moment.

Then, the LDA controller 172 calculates braking force that allows the first target yaw moment to be applied to the vehicle 1. At this time, the LDA controller 172 individually calculates the braking force applied to each of the front left wheel 121FL, the rear left wheel 121RL, the front right wheel 121FR, and the rear right wheel 121RR.

Then, the brake controller 173 calculates a pressure command value for specifying first hydraulic pressure required to generate the braking force calculated by the LDA controller 172 (step S203). At this time, the brake controller 173 individually calculates the pressure command value for specifying the hydraulic pressure inside each of the wheel cylinders 122FL, 122RL, 122FR, and 122RR.

Then, the brake controller 173 controls the brake actuator 13 on the basis of the pressure command value calculated in the step S203. As a result, the braking force corresponding to the pressure command value is applied to at least one of the front left wheel 121FL, the rear left wheel 121RL, the front right wheel 121FR, and the rear right wheel 121RR (step S204).

Then, the LDA controller 172 calculates a yaw rate to be generated on the vehicle 1 in order to correct the posture of the vehicle 1, as a second target yaw rate (step S205). Then, the LDA controller 172 calculates a yaw moment to be applied the vehicle 1 in order to generate the second target yaw rate on the vehicle 1, as a second target yaw moment (step S206).

Then, the LDA controller 172 calculates braking force that allows the second target yaw moment to be applied to the vehicle 1. At this time, the LDA controller 172 individually calculates the braking force applied to each of the front left wheel 121FL, the rear left wheel 121RL, the front right wheel 121FR, and the rear right wheel 121RR. Then, the brake controller 173 calculates a pressure command value for specifying second hydraulic pressure required to generate the braking force calculated by the LDA controller 172 (step S207).

Here, a direction of the second target yaw moment is opposite to a direction of the first target yaw moment (i.e. the suppression yaw moment). In other words, if the braking force associated with the wheels on one of the left and right sides of the vehicle 1 is set to be higher than the braking force associated with the wheels on the other side in order to apply the first target yaw moment to the vehicle 1, it is necessary to set the braking force associated with the wheels on the other side to be higher than the braking force associated with the wheels on the one side in order to apply the second yaw moment to the vehicle 1.

When the first target yaw moment is applied to the vehicle 1, the hydraulic pressure of the wheel cylinders of the wheels on the one of the left and right sides of the vehicle 1 is higher than the hydraulic pressure of the wheel cylinders of the wheels on the other side. In order to apply the second target yaw moment to the vehicle 1 immediately after applying the first target yaw moment to the vehicle 1, it is necessary to set the hydraulic pressure of the wheel cylinders of the wheels on the other side to be higher than the hydraulic pressure of the wheel cylinders of the wheels on the one side.

When the second target yaw moment is applied to the vehicle 1, the brake controller 173 uses the hydraulic pressure of the wheel cylinders of the wheels on the one of the left and right sides of the vehicle 1 and controls the brake actuator 13 to increase the hydraulic pressure of the wheel cylinders of the wheels on the other side (step S208).

This configuration can be adopted because the first target yaw moment for avoiding the departure of the vehicle 1 from the driving lane is always greater than the second target yaw moment for correcting the posture of the vehicle 1. In other words, the first hydraulic pressure for applying the first target yaw moment to the vehicle 1 is always greater than the second hydraulic pressure for applying the second target yaw moment to the vehicle 1.

Figure 4:
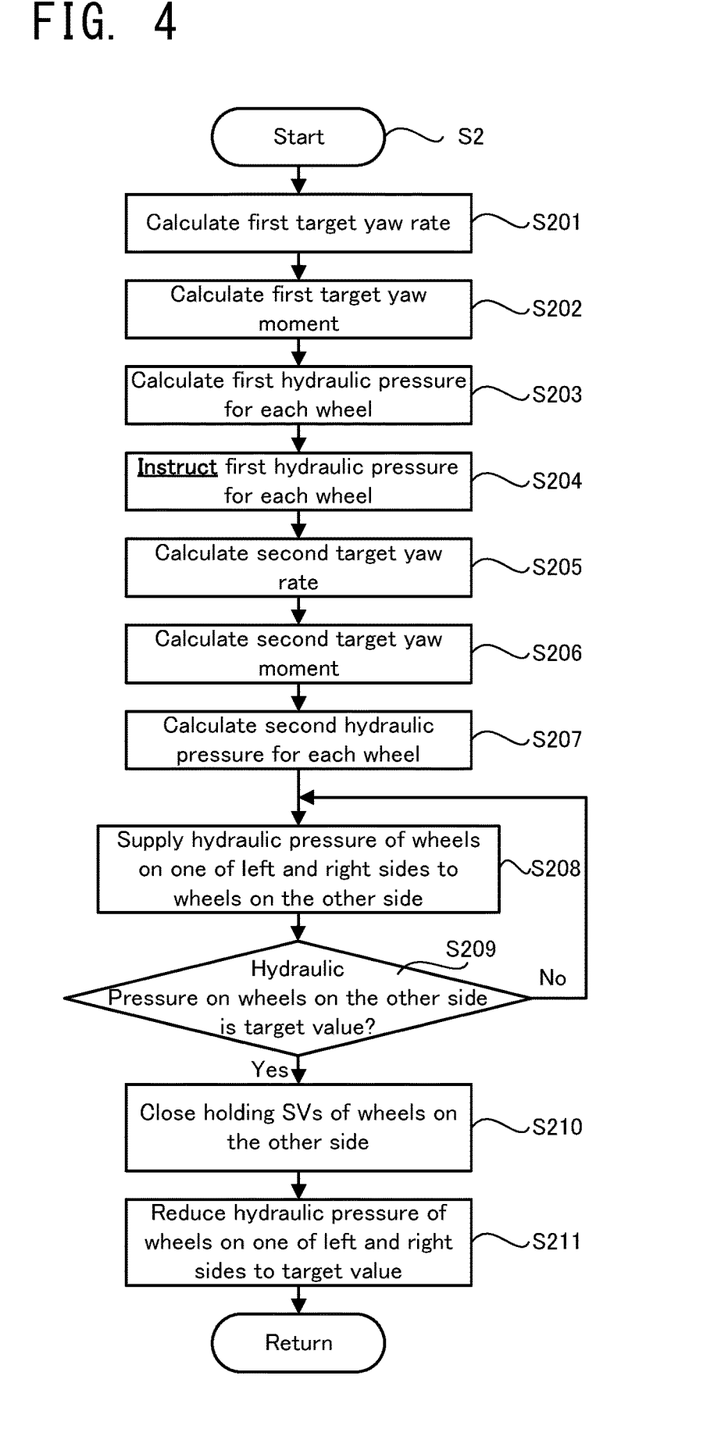
FIG. 4 is a flowchart illustrating a specific process of brake LDA and vehicle posture correction according to the embodiment.
Figure 5:
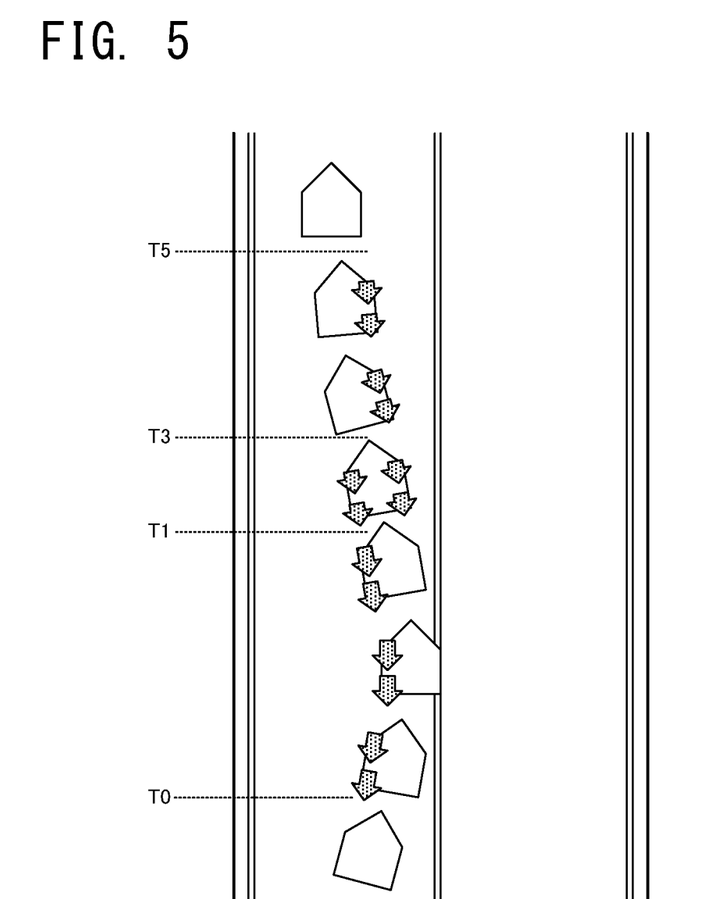
FIG. 5 is a conceptual diagram illustrating one example of braking force applied to a vehicle upon implementation of the lane departure suppressing operation and one example of a vehicle traveling path.

After the process in the step S208, the brake controller 173 determines whether or not the hydraulic pressure of the wheel cylinders on the other side of the left and right sides of the vehicle 1 (which are the wheel cylinders 122FR and 122RR in an example illustrated in FIG. 5) reaches the pressure command value calculated in the step S207 (i.e. a target value) (step S209). In the determination, if it is determined that the hydraulic pressure of the wheel cylinders on the other side does not reach the pressure command value (the step S209: No), the process in the step S208 is continued.

On the other hand, in the determination in the step S209, if it is determined that the hydraulic pressure of the wheel cylinders on the other side reaches the pressure command value (the step S209: No), the brake controller 173 controls the brake actuator 13 to close the holding SVs associated with the wheels on the other side (which are the holding SVs 132a and 132c in the example illustrated in FIG. 5) (step S210).

Then, the brake controller 173 controls the brake actuator 13 to open the holding SVs associated with the wheels on the one of the left and right sides of the vehicle 1 (which are the holding SVs 132b and 132d in the example illustrated in FIG. 5) and the master cylinder cut SVs 131a and 131b, in order to set the hydraulic pressure of the wheel cylinders of the wheels on the one side (which are the wheel cylinders 122FL and 122RL in the example illustrated in FIG. 5) at the pressure command value calculated in the step S207 (i.e. the target value) (step S211). As a result, the braking force applied to the wheels on the one side becomes less than the braking force applied to the wheels on the other side, and the second target yaw moment is applied to the vehicle 1.

By performing the process associated with the brake LDA and the posture correction of the vehicle illustrated in FIG. 4, the vehicle 1 travels along the new traveling path calculated in the step S201. After the process in the step S211, the control flag associated with the brake LDA is turned off, and the lane departure suppressing operation illustrated in FIG. 3 is ended. Then, the LDA controller 172 restarts the lane departure suppressing operation illustrated in FIG. 3 after a lapse of a first predetermined period.

One Example of Path of Vehicle by Lane Departure Suppressing Operation

One specific example of the path of the vehicle 1 by implementation of the process illustrated in FIG. 4 will be explained with reference to FIG. 5. FIG. 5 is a conceptual diagram illustrating one example of the braking force applied to the vehicle upon implementation of the lane departure suppressing operation and one example of the vehicle traveling path. Hatched arrows in FIG. 5 represent the braking force applied to the vehicle 1. FIG. 5 is the conceptual diagram, and thus, for example, a magnitude relation of the braking force or the like does not necessarily match the actual one. Reference numerals T0, T1, T3, and T5 in FIG. 5 indicate time points, and respectively correspond to reference numerals T0, T1, T3, and T5 in FIG. 6.

Here, an explanation will be given to the lane departure suppressing operation when there is a possibility that the vehicle 1 departs from the driving lane to the right side of the traveling direction. When the process illustrated in FIG. 4 is performed, firstly, the first target yaw moment for suppressing the departure of the vehicle 1 is applied to the vehicle 1, and then, the second target yaw moment for correcting the posture of the vehicle 1 is applied to the vehicle 1.

As illustrated in FIG. 5, in order to apply the first target yaw moment to the vehicle 1, the braking force is applied to the front left wheel 121FL and the rear left wheel 12RL (corresponding to the process in the step S204 in FIG. 4). At this time, the brake controller 173 controls the brake actuator 13 to open the holding SVs 132b and 132d while operating the pump 1 and the pump 2, wherein the holding SVs 132a and 132c, the pressure reducing SVs 133a to 133d, and the master cylinder cut SVs 131a and 131b are closed.

By applying the first target yaw moment to the vehicle 1, the vehicle 1 is turned to the left side of the traveling direction and approaches the center of the driving lane (refer to a period of a time point T0 to a time point T1 in FIG. 5).

Then, in order to apply the second target yaw moment to the vehicle 1, the braking force is applied to the front right wheel FR and the rear right wheel RR. Specifically, in the step S208 in FIG. 4, the hydraulic pressure of the wheel cylinders 122FL and 122RL of the front left wheel 121FL and the rear left wheel 121RL are firstly used to increase the hydraulic pressure of the wheel cylinders 122FR and 122RR of the front right wheel FR and the rear right wheel RR.

At this time, the brake controller 173 controls the brake actuator 13 to open the holding SVs 132a to 132d without operating the pump 1 and the pump 2, wherein the pressure reducing SVs 133a to 133d and the master cylinder cut SVs 131a and 131b are closed.

As a result, the wheel cylinders 122RL and 122FR are communicated with each other via the holding SV 132b, the pipe 134a, and the holding SV 132a. Thus, the hydraulic pressure of the wheel cylinder 122FR is increased while the hydraulic pressure of the wheel cylinder 122RL is reduced. In other words, the hydraulic pressure of the wheel cylinder 122RR is increased by the hydraulic pressure of the wheel cylinder 122RL. In the same manner, the wheel cylinders 122FL and 122RR are communicated with each other via the holding SV 132d, the pipe 134b, and the holding SV 132c. Thus, the hydraulic pressure of the wheel cylinder 122RR is increased while the hydraulic pressure of the wheel cylinder 122FL is reduced. In other words, the hydraulic pressure of the wheel cylinder 122RR is increased by the hydraulic pressure of the wheel cylinder 122FL.

In a period in which the hydraulic pressure of the wheel cylinders 122FR and 122RR is increased while the hydraulic pressure of the wheel cylinders 122FL and 122RL is reduced, the braking force is applied to each of the front left wheel 121FL, the rear left wheel 121RL, the front right wheel FR, and the rear right wheel RR (refer to a period of the time point T1 to a time point T3 in FIG. 5).

Then, in the step S211 in FIG. 4, the brake controller 173 controls the brake actuator 13 to close the holding SVs 132a and 132c and to open the holding SVs 132b and 132d and the master cylinder cut SVs 131a and 131b, wherein the pressure reducing SVs 133a to 133d are closed.

As a result, the holding SV 132b and the master cylinder cut SV 131a are opened. The wheel cylinder 122RL is communicated with the suction port of the pump 1 via the holding SV 132b and the master cylinder cut SV 131a, and the hydraulic pressure of the wheel cylinder 122RL is reduced. Moreover, the holding SV 132d and the master cylinder cut SV 131b are opened. The wheel cylinder 122FL is communicated with the suction port of the pump 2 via the holding SV 132d and the master cylinder cut SV 131b, and the hydraulic pressure of the wheel cylinder 122FL is reduced.

By applying the second target yaw moment to the vehicle 1, the vehicle 1 is turned to the right side of the traveling direction, and the posture of the vehicle 1 is corrected (refer to a period of the time point T3 to a time point T5 in FIG. 5).

The "brake controller 173" according to the embodiment is one example of the "controller" according to embodiments of the present invention. The "hydraulic pressure of the wheel cylinders of the wheels on one of the left and right sides" and the "hydraulic pressure of the wheel cylinders of the wheels on the other side" according to the embodiment are respectively one example of the "first brake fluid pressure" and the "second brake fluid pressure" according to embodiments of the present invention. In the example illustrated in FIG. 5, the "wheel cylinders 122FL and 122RL" are one example of the "first braking mechanism" according to embodiments of the present invention. The "wheel cylinders 122FR and 122RR" are one example of the "second braking mechanism" according to embodiments of the present invention. The "holding SVs 132b and 132d" are one example of the "first holding solenoid valve" according to embodiments of the present invention. The "holding SVs 132a and 132d" are one example of the "second holding solenoid valve" according to embodiments of the present invention.

Technical Effects

According to the lane departure suppressing operation in the embodiment, if there is a possibility that the vehicle 1 departs from the driving lane, the first target yaw moment (i.e. the suppression yaw moment) is applied to the vehicle 1. It is thus possible to suppress the departure of the vehicle 1 from the driving lane.

According to the lane departure suppressing operation in the embodiment, it is possible to suppress the driver's discomfort by performing the process in the step S208 and the subsequent processes. This will be specifically explained with reference to a timing chart in FIG. 6.

Figure 6:
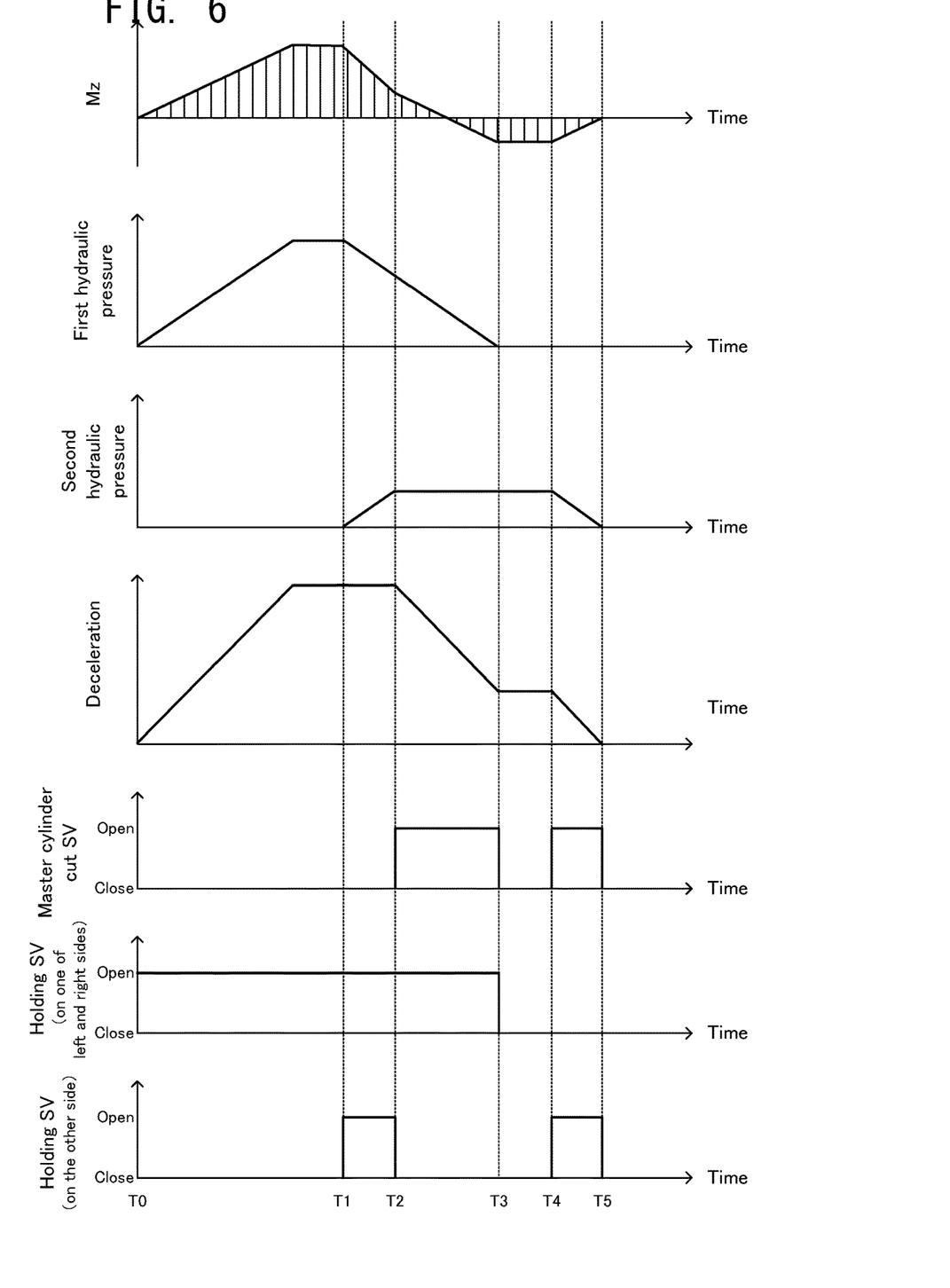
FIG. 6 is a timing chart illustrating a yaw moment, hydraulic pressure, deceleration, and an open/close state of each valve upon implementation of the lane departure suppressing operation according to the embodiment.

In FIG. 6, it is assumed that the application of the braking force to the wheels on one of the left and right sides is started in order to apply the first target yaw moment to the vehicle 1. At this time, the holding SVs associated with the wheels on the one side (which are the holding SVs 132b and 132d in the example illustrated in FIG. 5) are opened. After the hydraulic pressure of the wheel cylinders on the one side (which are the wheel cylinders 122FL and 122RL) (i.e. "first hydraulic pressure" in FIG. 6) reaches the pressure command value calculated in the step S203 in FIG. 4, the operation of the pumps is stopped, and the hydraulic pressure corresponding to the pressure command value is maintained. As a result, the first target yaw moment is applied to the vehicle 1 (refer to a graph associated with "Mz" in FIG. 6).

It is assumed that the application of the braking force to the other side is started at the time point T1 in order to apply the second target yaw moment to the vehicle 1. At this time, the holding SVs associated with the wheels on the one of the left and right side and the holding SVs associated with the wheels on the other side are opened.

From the time point T0 to the time point T1, the holding SVs associated with the wheels on the other side (which are the holding SVs 132a and 132c in the example illustrated in FIG. 5) are closed. Thus, the hydraulic pressure of the wheel cylinders of the wheels on the other side (which are the wheel cylinders 122FR and 122RR in the example illustrated in FIG. 5) (i.e. "second hydraulic pressure" in FIG. 6) is less than the hydraulic pressure of the wheel cylinders of the wheels on the one of the left and right sides. Thus, if the holding SVs associated with the wheels on the one side and the holding SVs associated with the wheels on the other side are opened, the hydraulic pressure of the wheel cylinders of the wheels on the one side is reduced due to a hydraulic pressure difference, while the hydraulic pressure of the wheel cylinders of the wheels on the other side is increased (refer to the time point T1 to a time point T2 in FIG. 6).

Here, in particular, it is noted that the pressure reducing SVs are not operated (i.e. are not opened) in the period of the time point T1 to the time point T2. The pressure reducing SVs according to the embodiment are duty control type solenoid valves. In operation, the pressure reducing SVs according to the embodiment make operating noise louder than in operation of the master cylinder cut SVs and the holding SVs, which are linear solenoid valves. The pressure reducing SVs have louder operating noise as the wheel cylinders have higher hydraulic pressure. In the embodiment, however, the pressure reducing SVs are not operated, by which the operating noise of the pressure reducing SVs can be prevented.

At the time point T2, if the hydraulic pressure of the wheel cylinders of the wheels on the other side reaches the pressure command value calculated in the step S207 in FIG. 4, the holding SVs associated with the wheels on the other side are closed, and the master cylinder cut SVs are opened.

At this time, the holding SVs associated with the wheels on the one of the left and right sides are kept open, and thus, the opening of the master cylinder cut SVs causes a reduction in the hydraulic pressure of the wheel cylinders of the wheels on the one side (refer to the time point T2 to the time point T3 in FIG. 6). In other words, in the embodiment, the master cylinder cut SVs are used instead of the pressure reducing SVs. It is therefore possible to prevent the generation of the operating noise of the pressure reducing SVs.

At the time point T3, if the hydraulic pressure of the wheel cylinders of the wheels on the one of the left and right sides reaches the pressure command value calculated in the step S207 in FIG. 4, the holding SVs associated with the wheels on the one side and the master cylinder cut SVs are closed. As a result, from the time point T3 to a time point T4, the second target yaw moment is applied to the vehicle 1.

Then, at the time point T4, the hydraulic pressure of the wheel cylinders of the wheels on the other side is reduced by opening the holding SVs associated with the wheels on the other side and the master cylinder cut SVs. Even in a period from the time point T4 to the time point T5, the pressure reducing SVs are not operated. It is thus possible to prevent the generation of the operating noise of the pressure reducing SVs.

Comparative Example

Now, a lane departure suppressing operation according to a comparative example will be explained with reference to a timing chart in FIG. 7.

Figure 7:
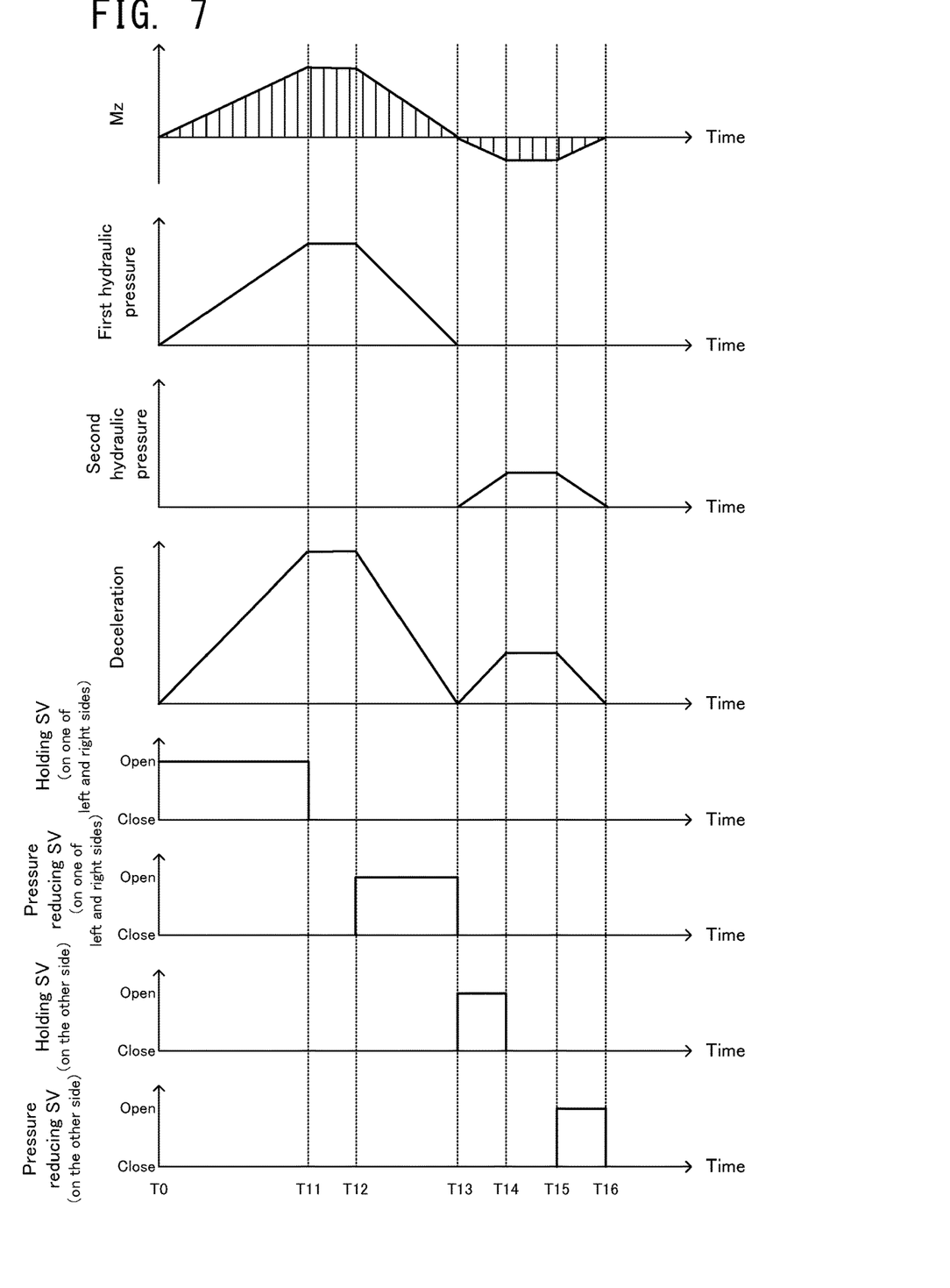
FIG. 7 is a timing chart illustrating a yaw moment, hydraulic pressure, deceleration, and an open/close state of each valve upon implementation of a lane departure suppressing operation according to a comparative example.

In the lane departure suppressing operation according to the comparative example, in order to apply the first target yaw moment to a vehicle, the holding SVs associated with the wheels on one of the left and right sides are opened while operating the pumps, and the pressure reducing SVs associated with the wheels on the one side are closed (refer to time points T0 to T11 in FIG. 7). Then, in order to reduce the hydraulic pressure of the wheel cylinders of the wheels on the one side (i.e. "first hydraulic pressure in FIG. 7), the pressure reducing SVs associated with the wheels on the one side are opened, and the holing SVs associated with the one side are closed (refer to time points T12 to T13 in FIG. 7).

Then, in order to apply the second target taw moment to the vehicle, the holding SVs associated with the wheels on the other side are opened while operating the pumps, and the pressure reducing SVs associated with the wheels on the other side are closed (refer to time points T13 to T14 in FIG. 7). Then, in order to reduce the hydraulic pressure of the wheel cylinders of the wheels on the other side (i.e. "second hydraulic pressure in FIG. 7), the pressure reducing SVs associated with the wheels on the other side are opened, and the holing SVs associated with the other side are closed (refer to time points T15 to T16 in FIG. 7).

In the lane departure suppressing operation according to the comparative example, deceleration in a longitudinal direction of the vehicle increases, decreases, increases, and decreases (refer to a graph associated with "deceleration" in FIG. 7). Thus, the driver possibly feels so-called momentary brake loss and discomfort.

On the other hand, with reference to a graph associated with "deceleration" in FIG. 6, the deceleration does not increase after the time point T2. This is because in the departure suppressing operation according to the embodiment, the hydraulic pressure of the wheel cylinders of the wheels on the one of the left and right sides causes an increase in the hydraulic pressure of the wheel cylinders of the wheels on the other side in the period of the time point T1 to the time point T2. Therefore, according to the departure suppressing operation in the embodiment, the driver's discomfort caused by the increase/reduction in the deceleration can be suppressed.

The period of the time point T1 to the time point T2 in FIG. 6, which is one specific example of the "predetermined period" according to embodiments of the present invention, is determined in accordance with a slope of the yaw moment (refer to the graph associated with "Mz" in FIG. 6) (i.e. the extent of a change in the yaw moment per unit time). A relatively sharp slope of the yaw moment possibly gives discomfort to the driver. On the other hand, a relatively mild slope of the yaw moment does not give discomfort to the driver; however, the application of the second target yaw moment is delayed, which increases a possibility that the vehicle 1 departs from the driving lane again.

In the embodiment, the period of the time point T1 to the time point T2 is set as a period in which the slope of the yaw moment does not give discomfort to the driver while preventing the vehicle 1 from departing from the driving lane again. Such a period can be realized by adjusting a pressure reducing slope of the hydraulic pressure of the wheel cylinders of the wheels on the one of the left and right sides (i.e. the "first hydraulic pressure" in FIG. 6) and a pressure increasing slope of the hydraulic pressure of the wheel cylinders of the wheels on the other side (i.e. the "second hydraulic pressure" in FIG. 6), and more specifically, by adjusting opening of the holding SVs.

In the example illustrated in FIG. 5, the braking force is applied to the front left wheel 121FL and the rear left wheel 121RL in order to suppress the departure of the vehicle 1 from the driving lane, and then, the braking force is applied to the front right wheel 121FR and the rear right wheel 121RR in order to correct the posture of the vehicle 1. By virtue of such a configuration, it is possible to reduce a load on the wheels, for example, in comparison with when the braking force is applied only to the front left wheel 121FL in order to suppress the departure from the driving lane, which is extremely useful in practice.

However, the braking force may be applied only to one of the front wheel and the rear wheel on one of the left and right sides in order to suppress the departure of the vehicle 1 from the driving lane, and then, the braking force may be applied only to one of the front wheel and the rear wheel on the other side in order to correct the posture of the vehicle 1.

In the period of the time point T2 to the time point T3 in FIG. 6, if the hydraulic pressure of the wheel cylinders of the wheels on the one of the left and right sides is reduced, the pressure reducing SVs may be used instead of the master cylinder cut SVs. The reason is as follows. The hydraulic pressure of the wheel cylinders of the wheels on the onside at the time point T2 is less than the hydraulic pressure at the time point T1. Even if the pressure reducing SVs are operated, the operating noise generated is relatively small. There is thus a low possibility that the operating noise of the pressure reducing SVs gives discomfort to the driver.

Modified Example

In the aforementioned embodiment, the first target yaw moment and the second target yaw moment are applied to the vehicle 1 by the lane departure suppression operation (i.e. the brake LDA). Embodiments of the present invention can be applied not only to the brake LDA but also to lateral wind control and an emergency avoidance operation in which the yaw moment is applied to the vehicle 1 by using the braking force difference between the left and right wheels.

Specifically, embodiments of the present invention can be applied to the lateral wind control if the first yaw moment for returning a vehicle, which departs from the center of a driving lane in the lane width direction due to lateral wind, to the center of the driving lane is applied to the vehicle, and if the second yaw moment for correcting the posture of the vehicle is then applied to the vehicle. Embodiments of the present invention can be applied to the emergency avoidance operation if the first yaw moment for avoiding a preceding vehicle, an obstacle, or the like is applied to a vehicle, and if the second yaw moment for correcting the posture of the vehicle is then applied to the vehicle. In any case, the driver's discomfort can be suppressed as in the aforementioned embodiment.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A vehicle control apparatus in a vehicle including a braking apparatus configured to apply a braking force corresponding to a brake fluid pressure, to each of a plurality of wheels, the braking apparatus includes: a pump configured to generate brake fluid pressure, a first braking mechanism configured to apply braking force corresponding to the first brake fluid pressure to the first wheels on one of the left side or the right side of the vehicle; a second braking mechanism configured to apply braking force corresponding to the second brake fluid pressure to the second wheels on the other of the left side of the right side of the vehicle; a first holding solenoid valve configured to communicate a discharge port of the pump with the first braking mechanism when it is open: a second holding solenoid valve configured to communicate the discharge port with the second braking mechanism when it is open: a first fluid passage, which connects a discharge port side of the first holding solenoid valve and a discharge port side of the second holding solenoid valve; and a master cylinder cut solenoid valve disposed in a second fluid passage, which connects a suction port of the pump and the first fluid passage, said vehicle control apparatus comprising:

a controller (i) configured to set a first brake fluid pressure associated with first wheels on one of a left side or a right side of the vehicle, from among the plurality of wheels, to be higher than a second brake fluid pressure associated with second wheels on the other of the left side or the right side of the vehicle, from among the plurality of wheels, in order to turn the vehicle in one direction, and configured (ii) to then increase the second brake fluid pressure by using a fluid pressure difference between the first brake fluid pressure and the second brake fluid pressure, and (iii) to set the first brake fluid pressure to be lower than the second brake fluid pressure while holding the second brake fluid pressure in order to turn the vehicle in another direction, which is different from the one direction, wherein said controller is configured ii) to open the first holding solenoid valve and to close the second holding solenoid valve and the master cylinder cut solenoid valve in a period in which the first brake fluid pressure is set to be higher than the second brake fluid pressure, (ii) to open the first holding solenoid valve and the second holding solenoid valve, thereby communicating the first braking mechanism with the second braking mechanism through the first fluid passage, and to close the master cylinder cut solenoid valve in a period in which the second brake fluid pressure is increased by using the fluid pressure difference, and (iii) to close the second holding solenoid valve and to open the first holding solenoid valve and the master cylinder cut solenoid valve, thereby communicating the first braking mechanism with the suction port, in a period in which the first brake fluid pressure is set to be lower than the second brake fluid pressure.

2. The vehicle control apparatus according to claim 1, wherein a period in which said controller increases the second brake fluid pressure by using the fluid pressure difference is a predetermined period from a pressure reduction start time point after the first brake fluid pressure reaches a predetermined fluid pressure.

3. The vehicle control apparatus according to claim 1, wherein said controller is configured to set the first brake fluid pressure to be higher than the second brake fluid pressure in such a manner that a yaw moment is generated in the one direction, in order to avoid departure of the vehicle from a driving lane on which the vehicle is currently traveling, if there is a possibility that the vehicle departs from the driving lane.

4. The vehicle control apparatus according to claim 2, wherein said controller is configured to set the first brake fluid pressure to be higher than the second brake fluid pressure in such a manner that a yaw moment is generated in the one direction, in order to avoid departure of the vehicle from a driving lane on which the vehicle is currently traveling, if there is a possibility that the vehicle departs from the driving lane.

* * * * *